Sept. 9, 1941.  J. K. SIMPSON  2,255,592
MECHANISM FOR PRODUCING ANGULAR MOVEMENT
Filed May 9, 1940  2 Sheets-Sheet 1
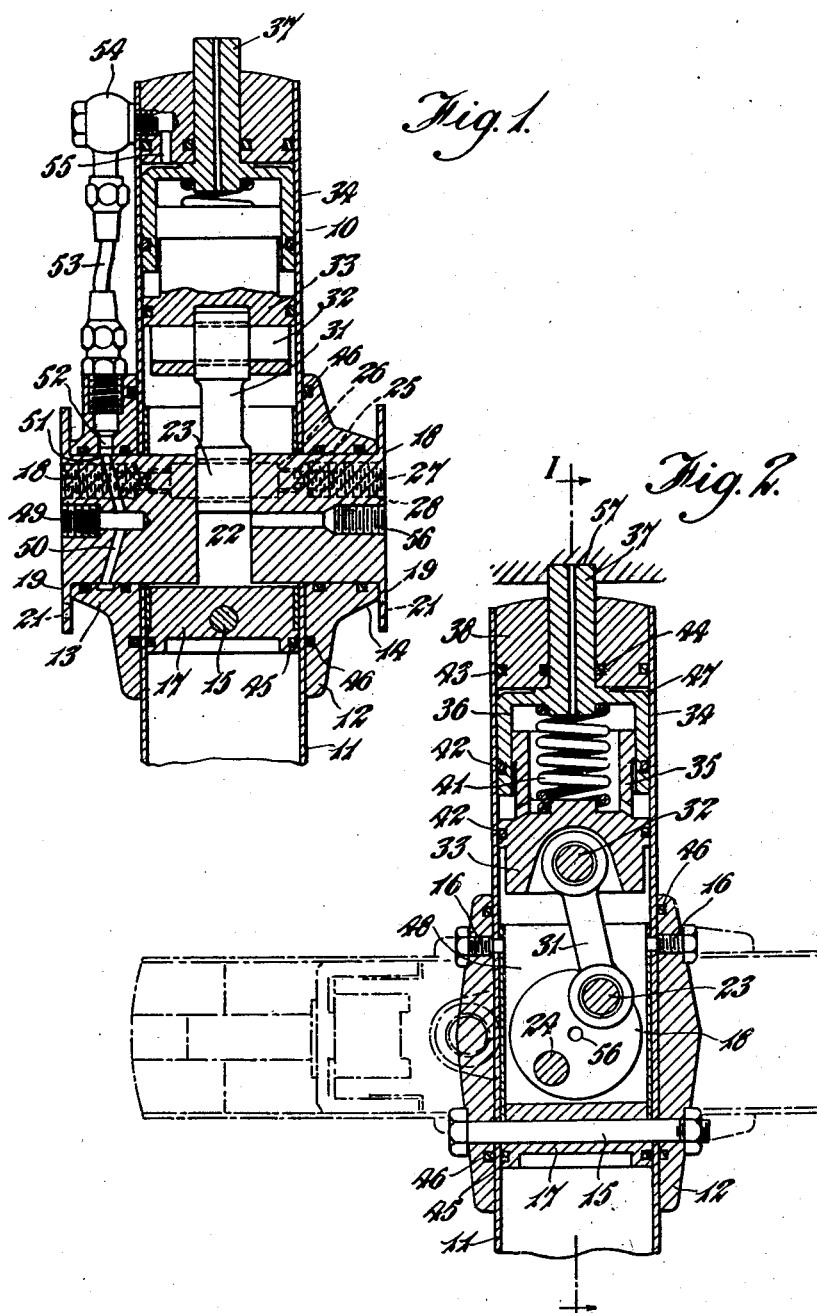
John K. Simpson
INVENTOR
By: Stevens & Davis
ATTYS.

Sept. 9, 1941.        J. K. SIMPSON        2,255,592
MECHANISM FOR PRODUCING ANGULAR MOVEMENT
Filed May 9, 1940        2 Sheets-Sheet 2
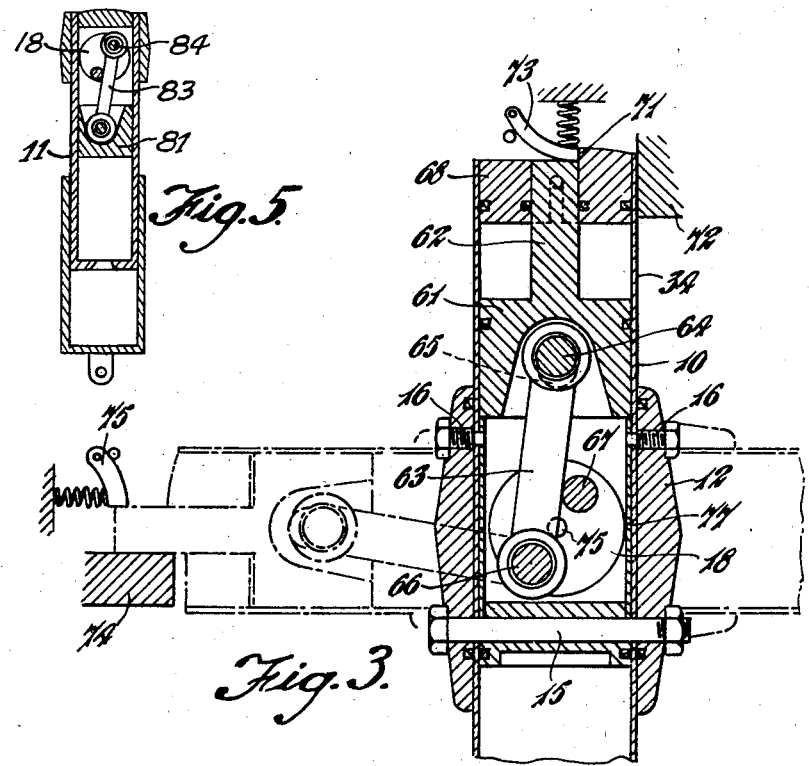
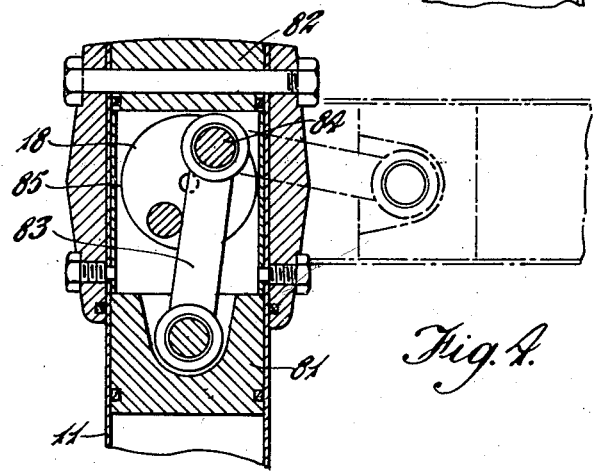
John K. Simpson
INVENTOR
By: Stevens and Davis
ATTYS.

Patented Sept. 9, 1941

2,255,592

UNITED STATES PATENT OFFICE 2,255,592

MECHANISM FOR PRODUCING ANGULAR MOVEMENT

John Keith Simpson, London, England, assignor to Automotive Products Company Limited, London, England Application May 9, 1940, Serial No. 334,290
In Great Britain May 6, 1939

4 Claims. (Cl. 244—102)

This invention relates to mechanism for producing angular movement, and is illustrated for use in retractable landing gear for aircraft.

It is the object of the invention to provide an improved form of mechanism which is arranged for actuation by fluid under pressure and which is particularly robust and simple in construction.

According to the invention, a tubular structural member adapted to move angularly about a pivot is characterised by the feature that the said member forms a cylinder containing a piston, the piston being moved axially within the tubular member to move the latter bodily about its pivotal mounting.

The structural member may be pivoted on a shaft formed with a crank, the piston being coupled to the crank by a connecting rod, and two pistons may be arranged one on each side of the shaft, and connected to separate cranks.

According to another feature of the invention, a retractable mounting for a wheel or equivalent landing member on an aircraft comprises a tubular strut adapted to move angularly about a substantially horizontal pivot shaft in the aircraft, wherein the tubular strut forms a cylinder, and a piston therein is coupled to a crank on the pivot shaft, the piston being moved axially within the tubular strut to move the latter bodily about its pivot. The tubular strut may form a cylinder in which fluid pressure acts on the piston, and also the cylinder of a telescopic shock absorber. The tubular strut may be pivoted intermediate its ends, the part on one side of the pivot forming the cylinder for the retracting piston, and the part on the other side of the pivot forming the shock absorber cylinder. A locking device for retaining the mounting in at least one of its extreme positions may be released by the application of fluid pressure to rotate the mounting about its pivot.

The invention will now be described with reference to the accompanying drawings, in which:

Figure 1 is a section through the upper end of a shock absorber strut for an aircraft landing gear, in which is incorporated the mechanism according to the invention, the section being taken on the line 1—1 of Figure 2;

Figure 2 is a section on a plane at right angles to that of Figure 1, through the same shock absorber strut;

Figure 3 is a section corresponding to Figure 2, of a modified arrangement;

Figure 4 is a corresponding section of a further arrangement; and

Figure 5 is a view similar to Figure 4 on a reduced scale, showing a shock absorber in vertical section attached to the rotating mechanism of Figure 4.

Referring to Figures 1 and 2, a tubular member 10 constituting a mounting for a wheel or equivalent landing member on an aircraft and forming at its lower part the cylinder 11 of an oleo-pneumatic shock absorber strut, is surrounded near its upper end, by a sleeve 12 formed with diametrically opposite hollow bosses 13, 14, the sleeve 12 being secured to the tubular member 10 by a diametral bolt 15 (Figure 2), and by a plurality of dowel pins 16. The bolt 15 serves also to secure in position an internal partition 17 closing the upper end of the shock absorber cylinder 11. Passing through the two bosses 13, 14 is a pivot shaft 18 having flanged ends 19 by which it may be secured by bolts through holes 21 to the aircraft structure, the pivot shaft 18 being divided to provide a space 22 bridged by two pins 23, 24 set eccentrically to the axis of the pivot shaft. These pins 23, 24 have each a central portion of greater diameter than their ends, and are screw threaded at each end. The pivot shaft 18 is formed with holes 25 in each of its portions to receive the ends of the pins, the holes 25 being shouldered at 26, and the shoulders produced by the change in diameter of the pins are drawn up against the shoulders 26 by cap nuts 27 screwed on to the ends of the pins and engaging with other shoulders formed by counterbored recesses 28 extending from the outer ends of the pivot shaft 18 co-axial with the holes 25. On the pin 23 is mounted a connecting rod 31, the other end of which is secured by a gudgeon pin 32 to a piston 33 slidable in the part 34 of the member 10 above the pivot shaft 18. The pin 23 thus forms a crank for the connecting rod 31.

The piston 33 has a hollow cylindrical projection 35 on its upper face over which is mounted a second or auxiliary cup-shaped piston 36, from which projects an axial stem 37 passing through an end closure plug 38 sealing the end of the part 34 of the member 10. A spring 41 is mounted between the two pistons, and tends to urge them apart. Each of the pistons is provided with a sealing ring 42 which may be of the type described in the specification of British Patent No. 474,055, and similar sealing rings 43, 44, 45 and 46, are provided to seal the end closure plug 38, the partition 17 and the sleeve 12 respectively. The pins 23 and 24 are disposed with their axes in a common diametral plane of the pivot shaft 18, this plane being at an angle of substantially 30° to the axis of the strut when the latter is in the extended position.

Provision is made for supplying fluid under pressure to the space 47 between the piston 36 and the end closure plug 38 for retracting the strut, and to the space 48 between the piston 33 and the partition 17 for extending the strut. The fluid is supplied through the pivot shaft 18, each of the working spaces being connected to a passage in one end of the said shaft. A stopped hole 49 in one part of the shaft 18 communicates with transverse bores 50 leading to a groove 51 cut in the interior surface of the boss 13, and a passage 52 leading from this groove 51 is connected by piping 53 and a banjo connector 54 to an orifice 55 in the end closure plug 38, through which liquid passes into the space 47. A hole 56 passes right through the other part of the pivot shaft 18, to supply fluid to the space 48.

The stem 37 projecting through the closure plug 38 is arranged to engage in a recess 57 in a convenient portion of the aircraft structure when the strut is in the extended position.

To retract the strut, fluid under pressure is supplied to the space 47 through the passages 49, 50, 51, 52, 53, 54 and 55, this fluid causing the piston 36 to move inwardly, compressing the spring 41 and withdrawing the stem 37 from the recess 57. When the piston 36 has moved far enough to release the stem 37 fully from the recess 57, the rim of the piston engages with the face of the piston 33, the two pistons then moving together as one. Such inward movement of the piston 33 is resisted by the connecting rod and can be accommodated only by turning of the strut about the axis of the pivot shaft 18, which increases the distance between the pin 23 and the closure plug 38. The strut turns through substantially a right angle to the position shown in chain-dotted lines in Figure 2, and may be retained in the retracted position either by retaining the fluid in the space 47, or by a separate mechanical lock. The lowering or extending of the strut is effected by supplying fluid to the space 48 by the passage 56, and releasing the fluid from the space 47, the stem 37 re-engaging with the recess 57 under the influence of the spring 41 when the strut is fully extended.

Figure 3 shows a modified form of the invention providing for automatic control of locking devices at both the extreme positions of a strut, by the fluid pressure performing the lowering and retraction of the strut. The tubular member 10 of the strut as in the arrangement shown in Figures 1 and 2 has a pivot shaft 18 passing through bosses on a sleeve 12 secured to the member 10 by a bolt 15 and dowels 16, the part 11 of the tubular member below the pivot shaft 18 forming the cylinder of a shock absorber strut, whilst the part 34 above the pivot shaft houses the retracting piston. In this arrangement a single piston 61 formed with a stem 62 is coupled with lost motion to a connecting rod 63, the gudgeon pin 64 being movable in slots 65 in the piston. The pins 66, 67 joining the two parts of the pivot shaft 18 are on a diametral plane of the pivot shaft at an angle of 60° to the axis of the tubular member when extended, and the connecting rod 63 is connected to the pin which is more remote from the head of the piston in that position. The stem 62 passes through the end closure plug 68 of the tubular member 10, which plug 68 has a segmental projecting portion bounded by a step 71. In the extended position, shown in full lines in the drawing, the upper end of the tubular member engages a fixed abutment 72, and a spring latch 73 engages with the step 71 to maintain the unit in position. In the retracted position, shown in chain-dotted lines, the stem 62 is engaged between an abutment 74 and a spring latch 75. When the strut is extended, the piston 61 is fully withdrawn into the tubular member, the end of the stem 62 being substantially level with the main outer surface of the closure plug 68. To retract the strut, pressure liquid is supplied through the passage 76 to the space 77 between the piston 61 and the partition 17. The pressure acts on the piston 61, first of all moving it through the lost motion allowed by the slots 65, during which the stem 62 lifts the latch 73 clear of the step 71, and, when the lost motion is taken up, causing the strut to turn about the pivot shaft 18. As the strut approaches the retracted position, the stem 62 pushes back the latch 75, which springs outwardly when the stem has passed, and retains the latter in engagement with the abutment 74. The strut is brought into the extended position by supplying fluid under pressure to the space 78 between the piston 61 and the end closure plug 68, through supply passages corresponding to those shown in Figure 1 for supplying the space 47, the lost motion between the piston and the connecting rod permitting the stem 62 to be withdrawn from its engagement with the latch 75 before any turning moment is applied to the strut.

In the arrangement shown in Figure 4, the piston 81 is on the same side of the pivot shaft 18 as is the shock absorber unit as shown in Figure 5, the top closure plug 82 for the tubular member being immediately above the shaft 18. The piston is connected by a connecting rod 83 to an eccentric pin 84 as in the previous examples, and the strut is retracted by admitting fluid under pressure to the space 85 between the piston 81 and the closure plug 82. The piston 81 forms the partition between the space 85 and the shock absorber cylinder 11, and thus the retraction of the strut causes compression of the resilient element of the shock absorber, so storing energy which may subsequently be utilised to return the strut to the extended position. With this arrangement, therefore, only one fluid connection to the strut is needed.

The arrangements shown in Figures 3 and 4 may be combined in a single strut, the piston 81 replacing the partition 17, and having its connecting rod coupled to the pin 67. The pressure for retracting the strut then acts on the combined area of the pistons 61 and 81, enabling a greater weight to be lifted by a given pressure, and the pressure acting on the piston 61 for lowering the strut is assisted by the stored energy in the shock absorber acting on the piston 81.

Whilst the invention has been described as applied to an undercarriage member of an aircraft, it will be understood that it may be applied to a number of other uses. For example, a permanently fitted lifting jack on a motor vehicle may be mounted for pivotal movement from a horizontal stored position to a vertical operative position by incorporating in its cylinder a mechanism according to the present invention.

What I claim is:

1. A retractable mounting for a wheel or equivalent member on a vehicle comprising a tubular strut forming a cylinder, a pivot shaft in the vehicle passing through the tubular strut and having a crank portion, and a piston in the said tubular strut, and means connecting the piston with the crank portion of the pivot shaft, and means to move the piston axially within the tubular strut to move the strut bodily about its pivot and retract the strut.

2. A retractable mounting for a wheel or equivalent member on a vehicle comprising a tubular strut, a pivot shaft in the vehicle having a crank and about which the strut is adapted to move angularly from an operative to a retracted position and vice versa, and a piston within said strut having a stem projecting beyond the end of the tubular strut to act as a locking device, a lost motion coupling connecting said piston to said crank, and means to apply fluid pressure to either side of said piston, so that the application of fluid pressure releases the locking device in either of the two positions of the strut, and thereafter rotates the strut to the other position.

3. A retractable mounting for a ground engaging member on a vehicle comprising a tubular strut, a pivot shaft adapted to be fixedly mounted on the vehicle supporting said strut and about which the strut is adapted to move angularly, a two part piston within the tubular strut, a connection between one part of the piston and a stationary part of the vehicle, a locking stem on the second part of the piston adapted to enter into engagement with a part of the vehicle and means to introduce a fluid within said strut to move the second part of the piston axially to disengage the locking stem from the vehicle and thereafter engage the first part of the piston to move the strut bodily about its pivot.

4. A retractable mounting for a ground engaging member on a vehicle comprising a telescopic shock absorber having a tubular portion on one end, a pivot shaft adapted to be fixedly mounted in the vehicle and having a crank portion and supporting said shock absorber and about which the shock absorber is adapted to move angularly, a piston within said tubular portion of the shock absorber, means connecting the piston with said crank and means to move the piston axially to rotate the shock absorber bodily about its pivot.

JOHN KEITH SIMPSON.